(12) United States Patent
Kinoshita et al.

(10) Patent No.: US 9,846,458 B2
(45) Date of Patent: Dec. 19, 2017

(54) ELECTRONIC DEVICE WITH DAMAGE PREVENTION FEATURES

(71) Applicant: Lenovo (Singapore) Pte. Ltd., Singapore (SG)

(72) Inventors: Hiroaki Kinoshita, Kanagawa-ken (JP); Eiji Shinohara, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/494,210

(22) Filed: Sep. 23, 2014

(65) Prior Publication Data

US 2015/0092331 A1 Apr. 2, 2015

(30) Foreign Application Priority Data

Sep. 27, 2013 (JP) ................. 2013-201324

(51) Int. Cl.
*H05K 5/00* (2006.01)
*G06F 1/16* (2006.01)

(52) U.S. Cl.
CPC .......... *G06F 1/1681* (2013.01); *G06F 1/1616* (2013.01); *G06F 1/1662* (2013.01)

(58) Field of Classification Search
CPC .... G06F 1/1616; G06F 1/1618; G06F 1/1681; G06F 1/1662; H05K 1/028
See application file for complete search history.

(56) References Cited

U.S. PATENT DOCUMENTS 8,792,237 B2* 7/2014 Guo ..................... G06F 1/1681
361/679.55

FOREIGN PATENT DOCUMENTS

| CN | 101276236 A | 10/2008 |
|----|-------------|---------|
| CN | 102625632 A | 8/2012 |
| CN | 103324245 A | 9/2013 |
| JP | H06065913 U | 9/1994 |
| JP | H07084677 A | 3/1995 |
| JP | H08022343 A | 1/1996 |
| JP | 2004227420 A | 12/2004 |
| JP | 2011048536 A | 10/2011 |
| JP | 2013155874 A | 8/2013 |
| WO | 2011049050 A | 4/2011 |

* cited by examiner

*Primary Examiner* — Robert J Hoffberg
*Assistant Examiner* — Hung Dang
(74) *Attorney, Agent, or Firm* — Ference & Associates LLC

(57) ABSTRACT

One embodiment provide an electronic device, including: a housing having an upper face and a lower face; a keyboard disposed in the upper face of the housing; a display part including a display; a hinge mechanism connecting the housing to the display part in a rotatable fashion; and a link mechanism that operates in conjunction with rotation of the display part to buffer the rotation of the display part when the display part is rotated beyond a predetermined angle with respect to the housing. Other aspects are described and claimed.

12 Claims, 13 Drawing Sheets

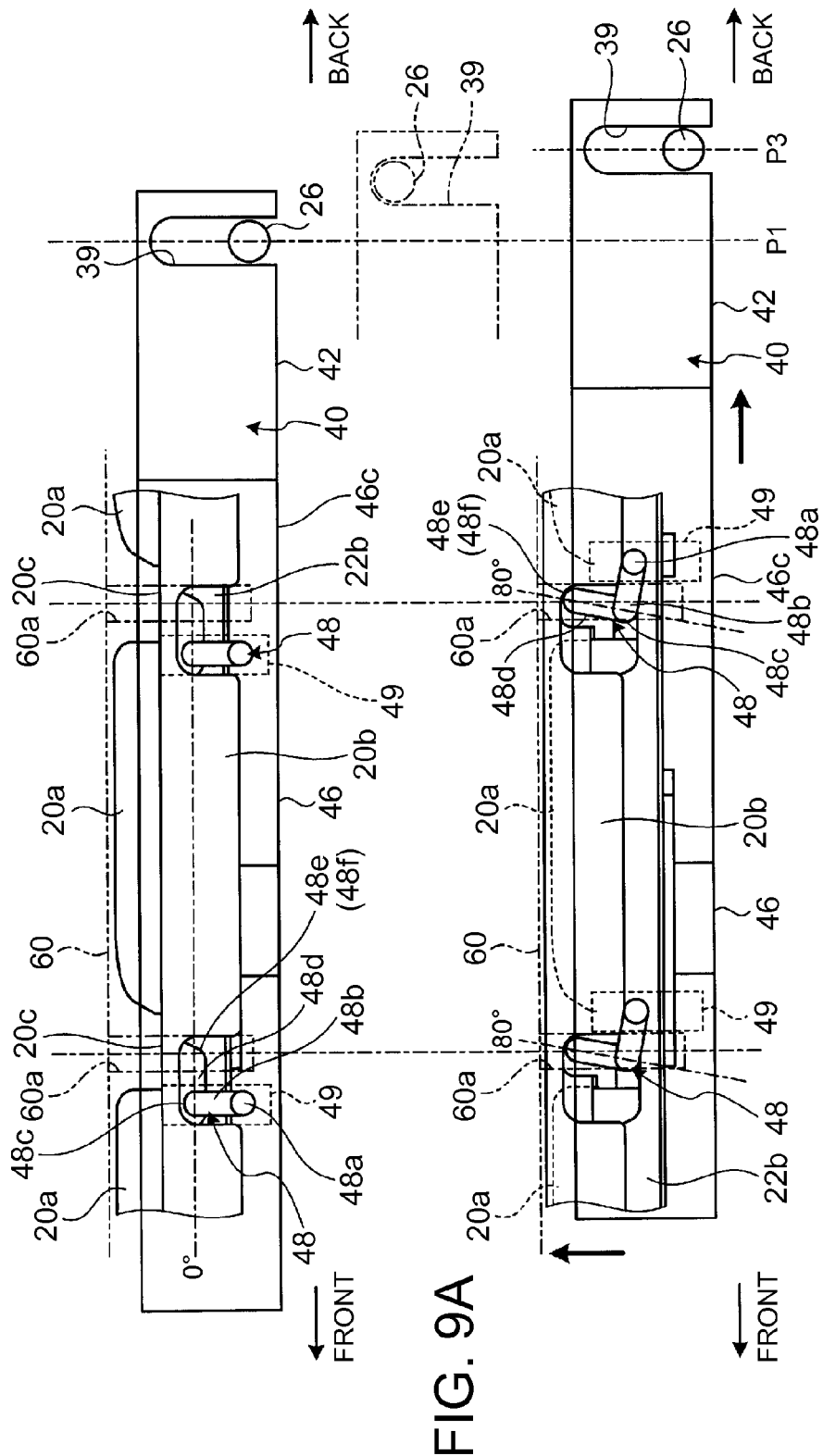

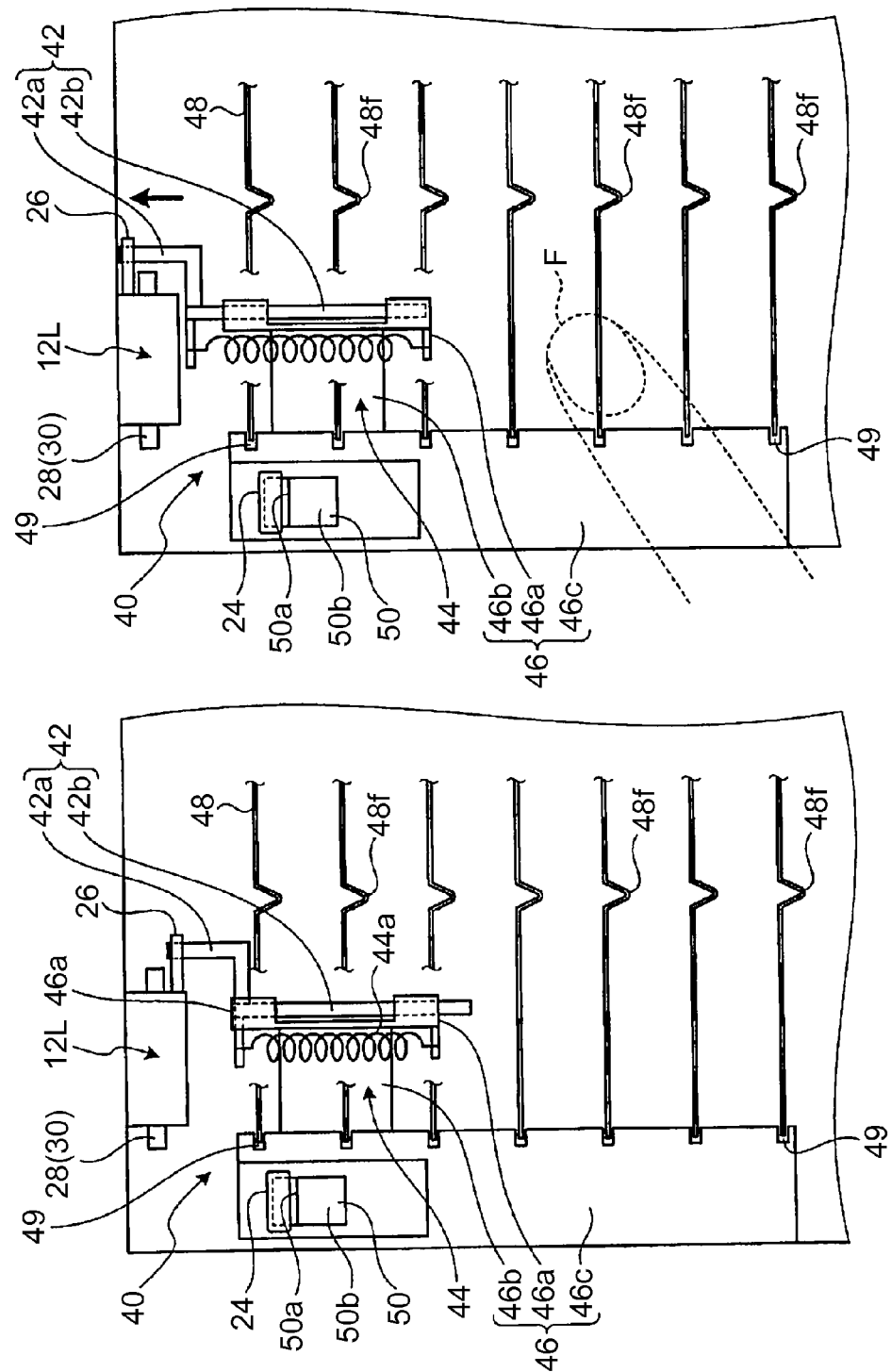

![US 9,846,458 B2]

ELECTRONIC DEVICE WITH DAMAGE PREVENTION FEATURES

CLAIM FOR PRIORITY

This application claims priority from Japanese Patent Application No. 2013-201324, filed on Sep. 27, 2013, and which is fully incorporated by reference as set forth herein.

FIELD

The subject matter generally relates to electronic devices including a main body part having a keyboard and a display part having a display that are joined rotatably via a hinge mechanism.

BACKGROUND

In recent years tablet-type personal computers (tablet PCs) having a touch-screen liquid crystal display and not having a physical keyboard have become rapidly more popular. A tablet PC is easy to carry around and is easy to operate because data can be entered using a touch screen.

Such a tablet PC, however, does not have a physical keyboard, and so it may affect the entry operation of the data containing long sentences, for example. Then a convertible tablet-type personal computer (convertible PC) has been proposed, including a display part having a display that is rotatable by 360 degrees beyond 180 degrees relative to a main body part having a keyboard. Since the convertible-type PC can be used in two ways including a normal laptop personal computer (laptop PC) and a tablet PC, this type of PC offers excellent convenience to users, and Japanese Patent Application Laid-Open No. 2013-155874, for example, discloses a two-axle structured hinge mechanism that can be used for such a structure.

BRIEF SUMMARY

In summary an embodiment provides an electronic device, comprising: a housing having an upper face and a lower face; a keyboard disposed in the upper face of the housing; a display part including a display; a hinge mechanism connecting the housing to the display part in a rotatable fashion; and a link mechanism that operates in conjunction with rotation of the display part to buffer the rotation of the display part when the display part is rotated beyond a predetermined angle with respect to the housing.

Another aspect provides a link mechanism, comprising: a hinge case; a slide member; a link member disposed in a main housing of an electronic device; the link member attaching to the hinge case that connects the main housing to a display part in a rotatable fashion; the link member attaching to the slide member disposed within the main housing; and a buffer that buffers rotation of the display part when the display part is rotated beyond a predetermined angle with respect to the main housing.

A further aspect provides an electronic device, comprising: a housing having an upper face and a lower face; a keyboard disposed in the upper face of the housing; a display part including a display; a hinge mechanism connecting the housing to the display part in a rotatable fashion; and a link mechanism that operates in conjunction with rotation of the display part raise an element to a plane above a top surface of one or more keys of the keyboard when the display part is rotated beyond a predetermined angle with respect to the housing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

FIG. 9A illustrates a state of the bezel and the link mechanism from the 0-degree position to the 180-degree position.

FIG. 9B illustrates a state of the bezel and the link mechanism at the 360-degree position.

FIG. 15A illustrates a state where a coil spring does not extend.

FIG. 15B illustrates a state where a coil spring extends and the buffer action by the buffer functions.

DETAILED DESCRIPTION

Figure 1:
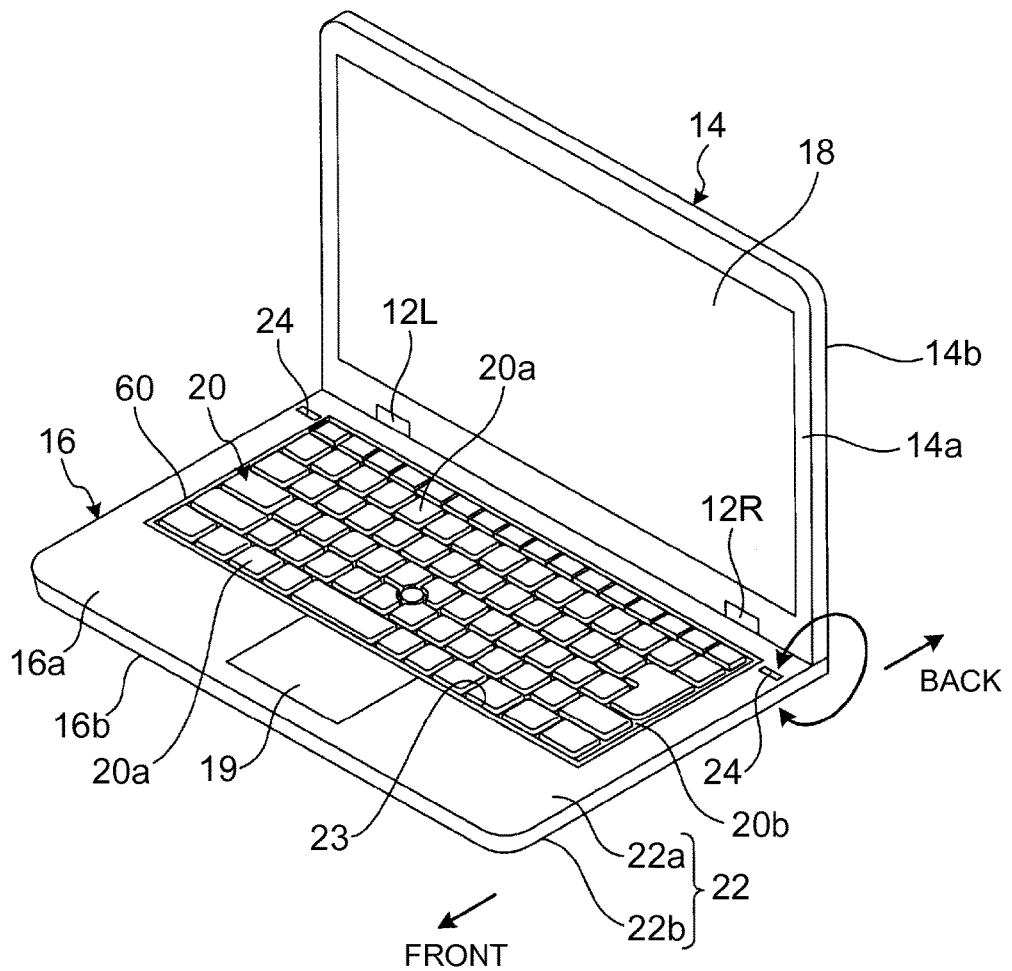
FIG. 1 is a perspective view of an electronic device according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a convertible-type PC is transformed to the usage form as a tablet PC by rotating the display part to a position of 360 degrees, the face (upper face) of the main body part having the keyboard thereon will face downward in this usage form. Then, when such a tablet PC is put on a desk or the like for use, the keyboard exposed at the lower face comes into contact with the hard top face of the desk, meaning instability of the PC and causing scratches or breakage on the keyboard or the like in some cases.

Then the two-axle structure in the aforementioned hinge mechanism may be used to provide a link mechanism so that, when the display part is rotated from the 180-degree position to the 360-degree position to be in the usage form as a tablet PC, for example, the link mechanism operates in a ganged manner with the rotary axle of this rotation range. A member at the periphery of the keyboard may be moved by this link mechanism, which can prevent the keyboard from directly coming into contact with the hard top face of a desk, for example.

Such a movable structure, however, may lead to a concern that, when a user tries to transform the convertible PC to be the usage form as a tablet PC while pressing a movable member with his/her finger, the link mechanism fails to operate correctly, and large load will be applied to various parts of the PC.

An embodiment therefore provides an electronic device including a mechanism that operates in a ganged manner with a rotation operation of a display part, the electronic device being capable of avoiding large load from being applied to such a mechanism and a hinge mechanism.

An electronic device according to an embodiment includes: a main body part including a main body chassis and a keyboard, a display part including a display, and a hinge mechanism that joints the main body part and the display part rotatably, the main body part and the display part being rotatable from a 0-degree position where the display and the keyboard face each other to a 360-degree position where the display and the keyboard face each other at rear faces thereof via a 180-degree position where the display and the keyboard are directed in a same direction to be in parallel to each other.

In an embodiment, the main body part includes a link mechanism that operates in a ganged manner with a rotation operation of the display part relative to the main body part from the 180-degree position to the 360-degree position and moves in a front-back direction relative to the main body chassis of the main body part, and a movable member that operates in a ganged manner with movement of the link mechanism to advance or retract from an outer face of the main body part, and the link mechanism includes a buffer capable of canceling a ganged operation state of a rotation operation of the display part and an advancing/retracting operation of the movable member.

With this configuration, even when the display part is rotated while holding the movable member that is to advance or retract from the outer face of the main body part with a user's hand, for example, the buffer can cancel the ganged operation state by the link mechanism between the rotation operation of the display part and the advancing/retraction operation of the movable member. This can avoid large load from being applied to the parts of the display part, the hinge mechanism and the link mechanism, and can avoid breakage or the like thereto.

The link mechanism may include a link member that moves in the front-back direction along with the rotation operation of the display part relative to the main body part from the 180-degree position to the 360-degree position, and a slide member that moves with the link member to advance or retract the movable member, and the buffer may include a spring member that joints the link member and the slide member. This configuration can easily cancel the joint state between the link member and the slide member by extension action of the spring member.

The movable member may be a bezel that is disposed at a periphery of the keyboard, and the bezel may be at a descending position to be below a top face of each key of the keyboard when the display part is at a position from the 0-degree position to the 180-degree position, may ascend along with the rotation operation of the display part from the 180-degree position to the 360-degree position, and may be at an ascending position to be substantially flush with the top face of each key of the keyboard when the display part is at the 360-degree position.

The movable member may be a leg part that is disposed at an upper face of the main body part, and the leg part may be at a position embedded from the upper face of the main body part when the display part is at a position from the 0-degree position to the 180-degree position, may ascend along with the rotation operation of the display part from the 180-degree position to the 360-degree position, and may be at a position to protrude from the upper face of the main body part when the display part is at the 360-degree position.

The hinge mechanism may have a two-axle structure including a first shaft and a second shaft, the second shaft starting to rotate after the first shaft rotates to a rotation end position, and the first shaft may rotate when the display part is at a position from the 0-degree position to the 180-degree position and the second shaft may rotate when the display part is at a position from the 180-degree position to the 360-degree position. The link mechanism may operate in a ganged manner with rotation of the second shaft. This simple configuration can join the display part to the main body part rotatably from the 0-degree position to the 360-degree position, and enables the switching of rotation between the first shaft and the second shaft at the 180-degree position as the border, so that the movable member can be driven for advancing/retraction smoothly using this hinge mechanism.

According to an embodiment, even when the display part is rotated while holding the movable member that is to advance or retract from the outer face of the main body part with a user's hand, for example, the buffer can cancel the ganged operation state by the link mechanism between the rotation operation of the display part and the advancing/retraction operation of the movable member. This can avoid large load from being applied to the parts of the display part, the hinge mechanism and the link mechanism, and can avoid breakage or the like thereto.

Referring to the attached drawings, the following describes electronic devices according to the present invention in details by way of illustrated examples.

Figure 2:
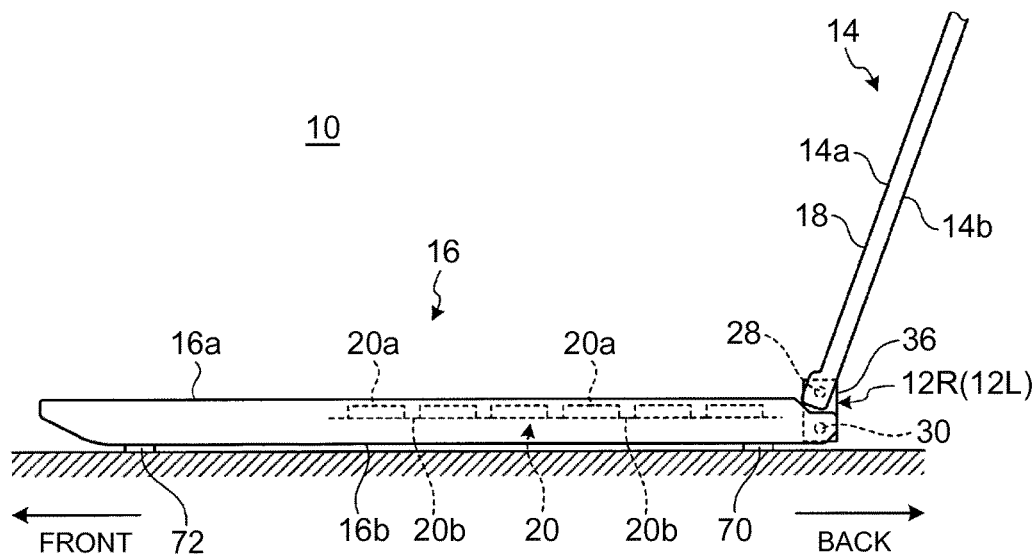
FIG. 2 illustrates a side view of an electronic device as a laptop PC.
Figure 3:
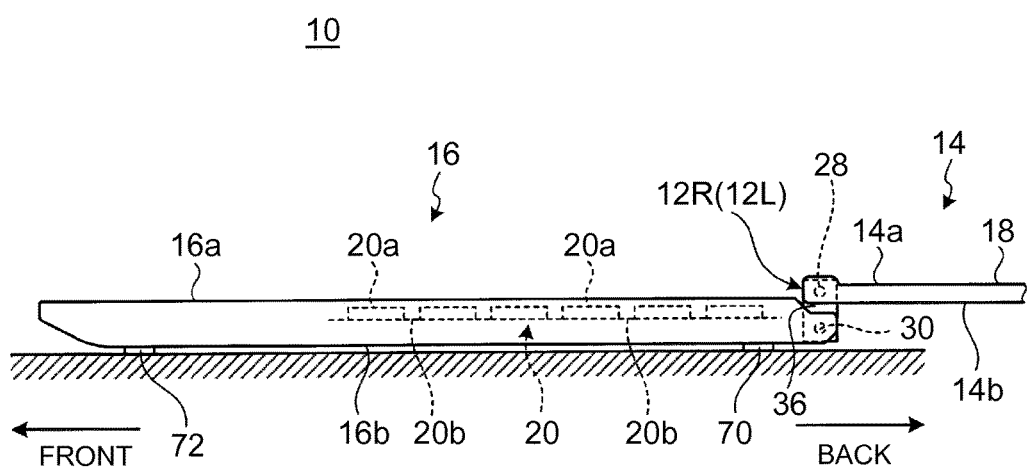
FIG. 3 is a side view illustrating a state where a display part is rotated in the opening direction from the state of FIG. 2 to a 180-degree position.
Figure 4:
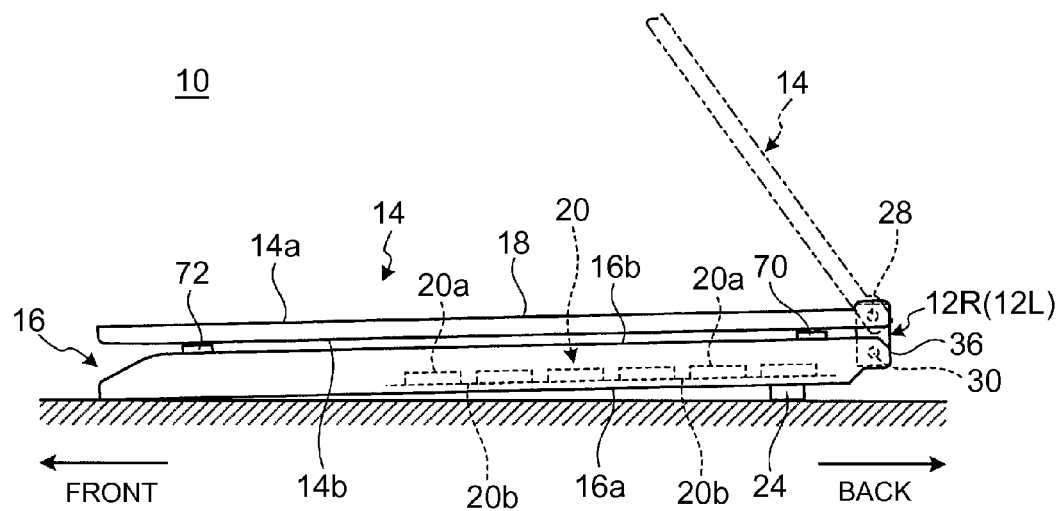
FIG. 4 is a side view illustrating a state where the display part is further rotated in the opening direction from the state of FIG. 3 to a 360-degree position.

FIG. 1 is a perspective view of an electronic device 10 according to one embodiment, and shows a state where a display part 14 is opened from a main body part 16 via a hinge mechanism 12L and 12R until they become substantially orthogonal. FIG. 2 is a side view illustrating one example of the usage form as a laptop PC of the electronic device 10 shown in FIG. 1. FIG. 3 is a side view illustrating the state where the display part 14 is rotated in the opening direction from the state of FIG. 2 to be the 180-degree position. FIG. 4 is a side view illustrating the state where the display part 14 is further rotated in the opening direction from the state of FIG. 3 to be the 360-degree position, which is one example of the usage form as a tablet PC.

The electronic device 10 according to an embodiment is a convertible tablet personal computer (convertible PC), which can be used preferably as a laptop PC in the state where the display part 14 is rotated to an angular position of around 90 degrees relative to the main body part 16 (see FIG. 1 and FIG. 2), and can be used preferably as a tablet PC in the state where the display part 14 is rotated to the 360-degree position relative to the main body part 16 (see FIG. 4). As indicated with the two-dot chain line in FIG. 4, when the display part 14 is raised a little bit from the 360-degree position, this can be used as a stand-type tablet PC including the main body part 16 as a base. An embodiment is applicable not only to such a convertible PC but also to any electronic devices including a display part that is rotatable to the 360-degree position relative to a main body part, such as a mobile phone, a smartphone, or an electronic notebook.

The following description is based on the usage form as a laptop PC illustrated in FIGS. 1 and 2, and viewed from a user who manipulates a keyboard 20 and a click pad 19 disposed at an upper face 16a of the main body part 16 while viewing a display 18 disposed at a front face 14a of the display part 14, a front side is referred to as a front side (forward) and a back side is referred to as a back side (backward), the thickness direction of the main body part 16 is referred to as a vertical direction, and the width direction is referred to as a horizontal description.

For the purpose of description, a 0-degree position (not illustrated) refers to an angular position between the main body part 16 and the display part 14 via the hinge mechanism 12L and 12R when the display part 14 is completely closed relative to the main body part 16 so that the display 18 and the keyboard 20 face each other. Then, the angles are measured in the direction where the display part 14 is rotated in the opening direction with reference to this 0-degree position. For instance, when it has the attitude where the display 18 and the keyboard 20 are in parallel to be directed in the same direction (in FIG. 3, they face upward), the attitude is referred to as a 180-degree position (see FIG. 3), and when it has the attitude where the display 18 and the keyboard 20 face each other at their rear-faces, i.e., the rear face 14b of the display part 14 and the lower face 16b of the main body part 16 face each other, the attitude is referred to as a 360-degree position (see FIG. 4). Note here that these 0-degree position, 180-degree position and 360-degree positions may include angular positions that are displaced from their precise angular position indicated with the numerals to some extent, because such displacement is naturally generated due to the structure of the main body part 16, the display part 14, or the hinge mechanism 12L and 12R, and so the present embodiment describes such a displaced angular position also as a 0-degree position and the like.

As illustrated in FIG. 1, the electronic device 10 includes the display part 14 having the display 18 and the main body part 16 having the keyboard 20, and the display part 14 and the main body part 16 are jointed rotatably from the 0-degree position to the 360-degree position via a pair of the left and right hinge mechanisms 12L and 12R (hereinafter called "hinge mechanism 12" collectively).

The display part 14 is electrically connected to the main body part 16 via a not-illustrated cable passing through the hinge mechanism 12. The display 18 includes a touch-screen type liquid crystal display, for example.

The main body part 16 includes a main body chassis 22 having a flat-box shape, at a back-end edge of which the hinge mechanism 12 is disposed, and the main body chassis 22 stores various electronic components that are not illustrated therein, such as a board, an arithmetic unit and a memory.

The keyboard 20 disposed at the upper face 16a of the main body part 16 includes a plurality of keys 20a and a bezel 20b provided at the periphery of the keys 20a. The bezel 20b is a frame body made up of one plate member having a plurality of holes 21 (see FIG. 10) for insertion of the keys 20a therethrough. The bezel 20b can move vertically in an opening of the upper face 16a of the main body part 16, specifically in an opening 23 at an upper cover 22a of the main body chassis 22 to dispose the keyboard 20 (see FIGS. 4 and 9(A-B)), and such vertical operation (advancing/retracting operation) and the rotation operation of the display part 14 via the hinge mechanism 12 are performed in a ganged manner.

The upper face 16a of the main body part 16 is provided with a pair of left and right leg parts (cushion part) 24, 24 at the side parts on the back side. Such a leg part 24 can appear or disappear from an opening at the upper face 16a of the main body part 16, specifically, from an opening 25 at the upper cover 22a of the main body chassis 22 (see FIGS. 4 and 8), and such appearance/disappearance operation (advancing/retracting operation) and the rotation operation of the display part 14 via the hinge mechanism 12 are performed in a ganged manner.

Figure 5:
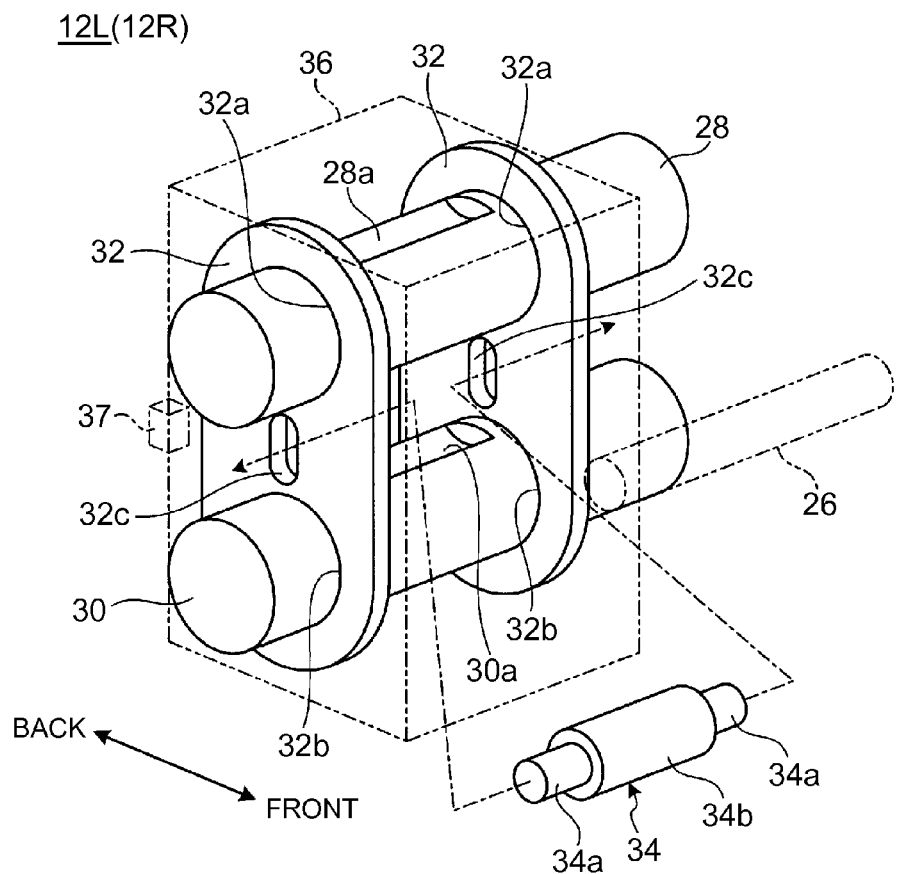
FIG. 5 is a perspective view schematically illustrating an example structure of a hinge mechanism.

The following describes an example structure of the hinge mechanism 12. FIG. 5 is a perspective view schematically illustrating the structure of the hinge mechanism 12 that is disposed at the electronic device 10 according to the present embodiment, and shows the state of the hinge mechanism 12L on the left side when the display part 14 is located from the 0-degree position to the 180-degree position relative to the main body part 16. The following describes the hinge mechanism 12L on the left side as an example of the hinge mechanism 12 as illustrated in FIG. 5 (FIG. 6), and the hinge mechanism 12R on the right side has a horizontally symmetrical structure of the hinge mechanism 12L on the left side, meaning that it has the same structure basically other than a link pin 26 indicated with the two-dot chain line in FIG. 5 that is attached on the horizontally opposite side, and so the detailed descriptions thereon are omitted.

As illustrated in FIG. 5, the hinge mechanism 12L (12R) includes a first shaft (first axle) 28 that extends horizontally, a second shaft (second axle) 30 that is disposed in parallel to the first shaft 28, and a pair of left and right guide plates 32, 32 that pivotally and rotatably supports the first shaft 28 and the second shaft 30. At a position between the pair of guide plates 32, 32 and sandwiched between the first shaft 28 and the second shaft 30, a float pin 34 is disposed, which is supported to be movable reciprocatively between the first shaft 28 and the second shaft 30 and be rotatable.

The first shaft 28 is jointed so as not to be rotatable relative to the display part 14 because both ends thereof are fitted into and fixed to not-illustrated fitting holes bored at the chassis of the display part 14. The second shaft 30 is jointed so as not to be rotatable relative to the main body part 16 because both ends thereof are fitted into and fixed to not-illustrated fitting holes bored at the main body chassis 22 of the main body part 16.

Each guide plate 32 is a belt-like plate member having both ends shaped an arc, including shaft holes 32a, 32b penetrating through the arc-shaped parts at both ends. The first shaft 28 is inserted rotatably into the shaft hole 32a, and the second shaft 30 is inserted rotatably into the shaft hole 32b. This allows the display part 14 to be supported rotatably with the first shaft 28 relative to the guide plates 32 and the main body part 16 to be supported rotatably with the second shaft 30 relative to the guide plates 32.

At a central part between the shaft holes 32a and 32b of each guide plate 32, an elongated hole 32c is disposed so as to extend in the direction where the shaft holes 32a and 32b are aligned (vertical direction in FIG. 5). A small-diameter part 34a at either end of the float pin 34 is inserted into the elongated hole 32c.

The float pin 34 is inserted at the small-diameter parts 34a on both ends into the elongated holes 32c of the left and right guide plates 32 from the inner-face side, and has a large-diameter part 34b at its center so as not to fall off from the elongated hole 32c. This allows the float pin 34 to be movable along the longitudinal direction of the elongated hole 32c and be rotatable in the elongated hole 32c as a bearing at a position between the left and right guide plates 32, 32 and between the first shaft 28 and the second shaft 30.

The first shaft 28 and the second shaft 30 have grooves 28a and 30a, respectively, at their outer periphery of the center parts located between the left and right guide plates 32 and 32, the grooves having an arc shape allowing the large-diameter part 34b of the float pin 34 to be fitted therein. As illustrated in FIG. 5, the grooves 28a and 30a face upward at the position where the display part 14 is located from the 0-degree position to the 180-degree position relative to the main body part 16. This means that, in the state of FIG. 5, the float pin 34 located at a lower part of the elongated hole 32c due to the gravity is fitted into the groove 30a of the second shaft 30 at its large-diameter part 34b (see FIGS. 6A to 6D).

As indicated with the two-dot chain line in FIG. 5, the hinge mechanism 12L (12R) has a box-shaped hinge chassis 36. The hinge chassis 36 stores all of the elements of the hinge mechanism 12L (12R) including the guide plates 32 in such a manner that the peripheral end faces of the guide plates 32 are fixed to its inner face, and both ends of the first shaft 28 and both ends of the second shaft 30 only protrude from both of the left and right side faces of the hinge chassis 36 to the outside, which are jointed to the display part 14 and the main body part 16, respectively.

The link pin 26 is disposed so as to protrude at one side face of the hinge chassis 36 at a position of the front side of the second shaft 30 (see the link pin 26 indicated with the two-dot chain line in FIG. 5). The link pin 26 is a component to operate the hinge mechanism 12, the bezel 20b and the leg part 24 in a ganged manner, which is disposed at the inner side face of each of the left and right hinge mechanisms 12L and 12R, and is jointed to a link mechanism 40 described later (see also FIG. 7).

A stopper piece 37 is provided so as to protrude at the other side face of the hinge chassis 36 at a position on the back side of the elongated hole 32c (see the stopper piece 37 indicated with the two-dot chain line in FIG. 5). The stopper piece 37 comes into contact with the display part 14 when the display part 14 is located at the 180-degree position to restrict further rotation of the display part (see FIG. 6D also).

Figure 6:
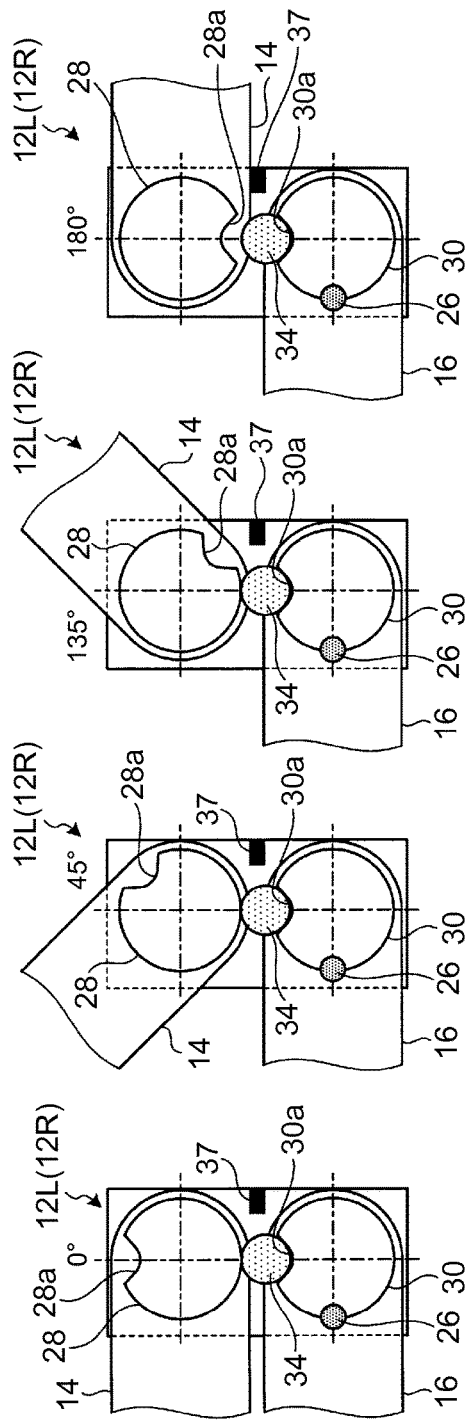
FIG. 6(A-G) illustrates an example diagram schematically showing the rotational movement of a display part relative to a main body part using the hinge mechanism.

The following describes rotation operation of the display part 14 and the main body part 16 via the hinge mechanism 12. FIG. 6 schematically describes the rotation operation of the display part 14 relative to the main body part 16 via the hinge mechanism 12 illustrated in FIG. 5, and shows the operation of the left-side hinge mechanism 12L as an example. In FIG. 6, FIG. 6A shows the 0-degree position, FIG. 6B shows the 45-degree position, FIG. 6C shows the 135-degree position, FIG. 6D shows the 180-degree position, FIG. 6E shows the 225-degree position, FIG. 6F shows the 315-degree position and FIG. 6G shows the 360-degree position.

When the display part 14 is rotated in the direction opening from the main body part 16, the float pin 34 is firstly fitted into the groove 30a from the 0-degree position to the 180-degree position illustrating in FIG. 6A to FIG. 6D, and so the rotation of the second shaft 30 is restricted, so that the main body part 16, the second shaft 30 and the hinge chassis 36 are integrated. This means that the display part 14 rotates with the first shaft 28 relative to these main body part 16, second shaft 30 and hinge chassis 36 about the first shaft 28 as a rotation shaft. In this case, this can be used as a laptop PC as illustrated in FIG. 2, for example.

At the 180-degree position illustrated in FIG. 6D (see FIG. 3 also), the rear face 14b of the display part 14 comes into contact with the stopper piece 37 disposed at the hinge chassis 36, and so the rotation of the display part about the first shaft 28 as a rotation shaft is restricted. In this state, the groove 28a of the first shaft 28 faces downward, and so can receive the float pin 34 therein.

Subsequently, when the display part 14 is rotated in the further opening direction from the 180-degree position, then the display part 14, the first shaft 28 and the hinge chassis 36 become integrated via the stopper piece 37 as illustrated in FIG. 6E, and they start to rotate about the second shaft 30 as a rotation shaft. This rotation makes the float pin 34 leave from the groove 30a of the second shaft 30 and enter the groove 28a of the first shaft 28 for fitting, thus canceling the integration of the main body part 16, the second shaft 30 and the hinge chassis 36. This makes the display part 14, the first shaft 28 and the hinge chassis 36 integrated in the further opening direction from the 180-degree position as illustrated in FIGS. 6E to 6G, where the display part rotates relative to the main body part 16 about the second shaft 30 as a rotation shaft.

Finally as illustrated in FIG. 6G, the display part 14 comes around behind the main body part 16 on the rear face side, and when the stopper piece 37 comes into contact with the rear face of the main body part 16, the rotation is restricted to be the 360-degree position, where this can be used as a tablet PC as illustrated in FIG. 4, for example.

Figure 7:
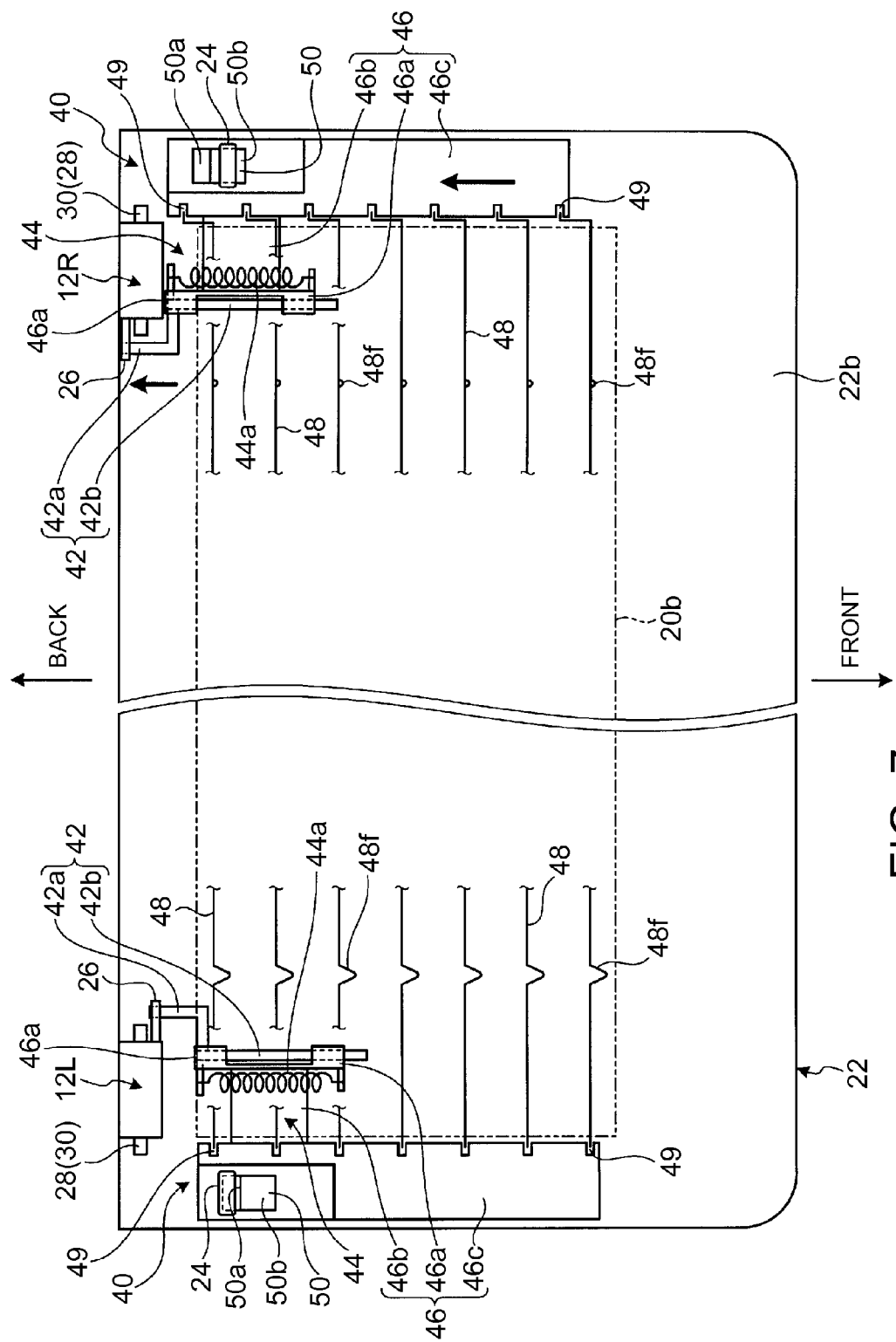
FIG. 7 is a plan view schematically illustrating an internal structure of a main body part.

The following is an example description of a movable structure that operates in a ganged manner with rotation operation via hinge mechanism. With respect to an example link mechanism 40 to operate the bezel 20*b* and the leg part 24 in a ganged manner with the rotation operation of the display part 14 via the hinge mechanism 12, FIG. 7 is a plan view schematically illustrating the internal structure of the main body part 16 after removing the upper cover 22*a* of the main body chassis 22 to schematically show the link mechanism 40 to move the bezel 20*b* and the leg parts 24 in a ganged manner with the hinge mechanism 12. In FIG. 7, the hinge mechanism 12L on the left side and the link mechanism 40 operating in a ganged manner therewith show the state at the 0-degree position, and the hinge mechanism 12R on the right side and the link mechanism 40 operating in a ganged manner therewith show at the 360-degree position.

As illustrated in FIG. 7, the link mechanism 40 is stored inside the main body chassis 22 of the main body part 16, and includes a link member 42 that is jointed to the hinge mechanism 12 and a slide member 46 that is jointed to the link member 42 via a buffer 44.

The link member 42 includes a L-letter shaped engagement arm 42*a* having one end engaging with the link pin 26 of the hinge mechanism 12, and a rail 42*b* extending from the other end of the engagement arm 42*a* to the front side. The link member 42 is disposed to be movable in the front-back direction on the upper face (inner face) of the lower cover 22*b*. An engagement recess 39 is provided at the leading end of the engagement arm 42*a*, the engagement recess extending in the vertical direction and being open on the lower side (see FIGS. 8(A-C) and 9(A-B)). The link pin 26 engages with the engagement recess 39 from the above, whereby the link pin 26 and the engagement arm 42*a* (link mechanism 40) can be jointed, and the link pin 26 can be held in a vertically movable and rotatable state in the engagement recess 39.

The slide member 46 includes a pair of front and back sliders 46*a* and 46*a* that slidably engage with the rail 42*b* of the link member 42 and a slide frame 46*c* jointed to the slider 46*a* via a bridge 46*b*, and is disposed to be movable in the front-back direction on the upper face (inner face) of the lower cover 22*b*. A coil spring (spring member) 44*a* making up the buffer 44 is hung between the front-end side of the slider 46*a* and the back-end side of the rail 42*b*. That is, the link member 42 and the slide member 46 are jointed via the coil spring 44*a*, and in a normal state, as the link member 42 moves with the rotation operation of the hinge mechanism 12, the coil spring 44*a* functions as a substantially hard rod member, so that the slide member 46 also moves with the link member 42. On the other hand, when the hinge mechanism 12 is rotated in the state where the slide member 46 cannot move because of external force applied, the coil spring 44*a* extends, and so the link member 42 only moves. The buffer 44 may have another structure instead of the coil spring 44*a*.

At an inner side face of the slide frame 46*c*, a plurality of slits 49 is formed for engagement with driving wires 48 that extend in the horizontal direction while being pivotally supported at the lower face of the bezel 20*b*. At a back end part on the outside of the slide frame 46*c*, a pressing base 50 is disposed to be located below the leg part 24. The pressing base 50 has a pressing-side inclined face 50*a* that is inclined gradually downward toward the back side that is the advancing direction of the slide frame 46*c* and a base 50*b* that extends from the top part of the pressing-side inclined face 50*a* to the front side. The slide frame 46*c* has an elongated hole 46*d* in the front-back direction, into which a guide pin 51 standing from the lower cover 22*b* is inserted, whereby the slide frame 46*c* is guided in the front-back direction (see FIGS. 10 and 11).

The following describes the movable structure of the leg part 24. Firstly, the following describes the structure of the leg part 24. FIG. 8(A-C) shows a side view to describe the advancing/retracting operation of the leg part 24, where FIG. 8A illustrates the state of the leg part 24 and the link mechanism 40 from the 0-degree position to the 180-degree position, FIG. 8B illustrates the state of the leg part 24 and the link mechanism 40 at the 270-degree position, and FIG. 8C illustrates the state of the leg part 24 and the link mechanism 40 at the 360-degree position.

As illustrated in FIG. 8(A-C), the leg part 24 is a leg member made of a rubber material or a resin material, which is disposed in an opening 25 of the upper cover 22*a* of the main body chassis 22. The leg part 24 has a lower-end part (base part) that is supported to be vertically movable by a base member 52 disposed in the main body part 16, whereby the leg part can advance or retract vertically to appear or disappear from the opening 25.

The base member 52 is a plate-shaped member having an upper end face, to which the leg part 24 is attached for fixation. The base member 52 is provided with a shaft pin 52*a* at its front end to be along the horizontal direction, where the shaft pin 52*a* is pivotally supported at a bearing 43 having a curved face disposed at the lower face of the upper cover 22*a*. The base member 52 includes a pressed base 54 having a pressed-side inclined face 54*a* that is inclined gradually downward to the back side and a base 54*b* that extends from the lower end part of the pressed-side inclined face 54*a* to the back side. The pressed-side inclined face 54*a* faces the pressing-side inclined face 50*a* of the pressing base 50 disposed at the slide frame 46*c* in a slidably contactable manner. FIG. 7 omits the base member 52 for easy viewing of the drawing.

Figure 8A:
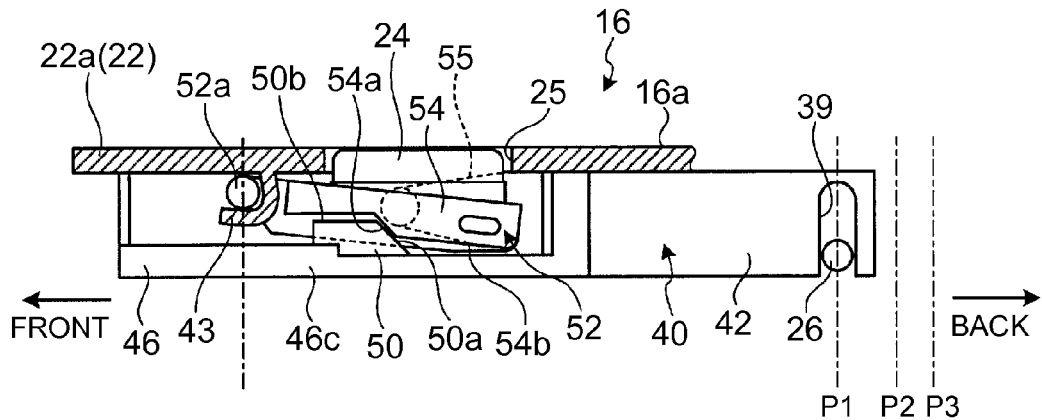
FIG. 8A illustrates a state of the leg part and the link mechanism from the 0-degree position to the 180-degree position.
Figure 8B:
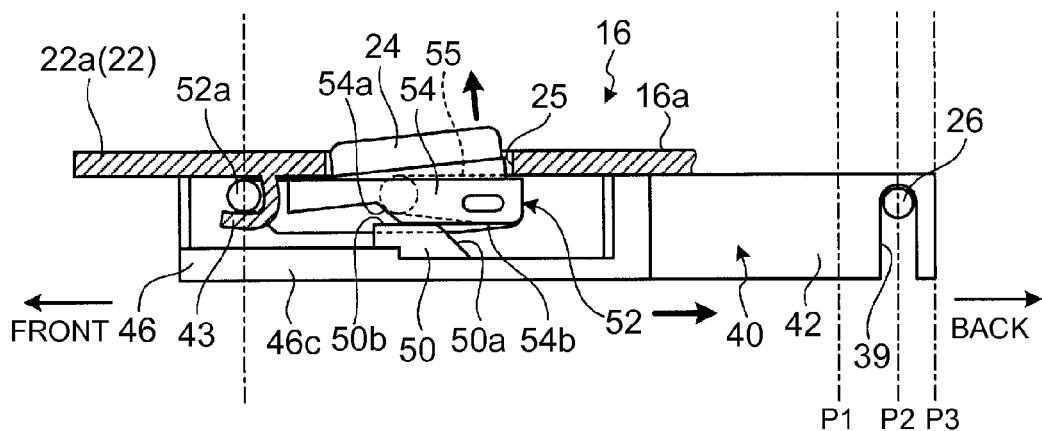
FIG. 8B illustrates a state of the leg part and the link mechanism at the 270-degree position.
Figure 8C:
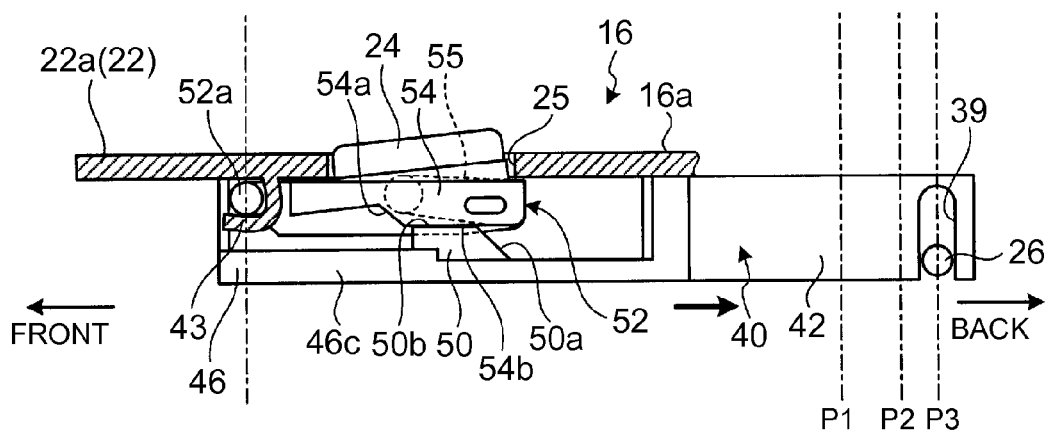
FIG. 8C illustrates a state of the leg part and the link mechanism at the 360-degree position.

As illustrated in FIGS. 8A to 8C, the base member 52 can rotate vertically relative to the main body chassis 22 about the shaft pin 52*a* as a rotation shaft, and such vertical movement of the base member 52 makes the leg part 24 appear or disappear from the opening 25. The base member 52 is provided with a helical torsion coil spring 55 having one end that presses the base member 52 downward and the other end that presses the lower face of the upper cover 22*a* upward. The biasing force of the helical torsion coil spring 55 always biases the base member 52 downward, which always biases the leg part 24 as well in the retracting direction to be embedded in the opening 25.

The following describes the advancing/retracting operation of the leg part 24. During the rotation operation of the display part 14 via the hinge mechanism 12, the link pin 26 protruding from the side face of the hinge chassis 36 is kept at the same position together with the hinge chassis 36 that does not move from the 0-degree position to the 180-degree position illustrated in FIG. 6A to FIG. 6D, and is kept at a position on the front side of the second shaft 30. Then, as the display part 14 is rotated beyond the 180-degree position, then the link pin 26 also gradually moves backward (see FIGS. 6E and 6F) along with the hinge chassis 36 that rotates about the second shaft 30 as a shaft center, and at the 360-degree position, the link pin will move to the position on the back side of the second shaft 30 (see FIG. 6G).

In this way, till the 180-degree position of the rotation angle of the display part 14, the link pin 26 of the hinge mechanism 12 does not move in the front-back direction, but after the display part rotates beyond the 180-degree position, the link pin gradually moves to the back side with an increase in the rotation angle.

This means that, as shown in FIG. 8A, the link pin 26 does not move from the position P1 in the front-back direction as stated above from the 0-degree position to the 180-degree position, and the slide frame 46c making up the link mechanism 40 also is kept at the initial position. At this time, the pressing-side inclined face 50a of the pressing base 50 and the pressed-side inclined face 54a of the pressed base 54 face each other and have a positional relationship that are close or slightly in contact. As a result, the base member 52 is at the retracting to be rotated downward due to the biasing force from the helical torsion coil spring 55, and so the leg part 24 is embedded in the opening 25 so that the upper face thereof is flush with or substantially flush with the upper face 16a of the main body part 16. That is, in the usage form as a laptop PC illustrated in FIG. 2 (from the 0-degree position to the 180-degree position), the leg part 24 defines a part of the upper face 16a of the main body part 16, and does not interfere with the operation of the electronic device 10 and does not affect the appearance thereof.

Subsequently, as the display part 14 is rotated beyond the 180-degree position, the link pin 26 moves upward while turning about the second shaft 30 as a rotation shaft together with the hinge chassis 36 that rotates in the opening direction about the second shaft 30 as a shaft center, and moves backward in the front-back direction position. Then, at the 270-degree position, for example, the link pin 26 is located at the position P2 illustrated in FIG. 8B (see FIGS. 6E and 6F also). As a result, as illustrated in FIG. 8B, the link pin 26 moves upward in the engagement recess 39 of the engagement arm 42a of the link member 42 while pulling and moving the link member 42 backward.

As illustrated in FIG. 8B, as the link member 42 moves backward, the slide frame 46c of the slide member 46 also moves backward, so that the pressing-side inclined face 50a of the pressing base 50 and the pressed-side inclined face 54a of the pressed base 54 are brought into slidably contact with each other. Then, the pressed-side inclined face 54a that is restricted at the front-back direction position by the shaft pin 52a receives the push-up force from the pressing-side inclined face 50a that moves backward. Then, the base member 52 rotates upward about the shaft pin 52a as a shaft center against the biasing force of the helical torsion coil spring 55, and so the leg part 24 advances upward to protrude from the opening 25. At this time, at the 270-degree position illustrated in FIG. 8B, for example, the pressed-side inclined face 54a totally climbs over the pressing-side inclined face 50a so that the base 50b of the pressing base 50 and the base 54b of the pressed base 54 come in contact with each other.

When the display part 14 is further rotated, then the link pin 26 turns about the second shaft 30 as a shaft center to gradually move downward, and its front-back direction position further moves backward. At the 360-degree position, for example, the link pin is located at the position P3 illustrated in FIG. 8C (see FIG. 6G also). As a result, as shown in FIG. 8C, the link pin 26 then moves downward in the engagement recess 39 of the engagement arm 42a of the link member 42 while further pulling and moving the link member 42 backward.

As illustrated in FIG. 8C, when the link member 42 moves further backward, the slide frame 46c of the slide member 46 also moves further backward, meaning that the base 50b of the pressing base 50 and the base 54b of the pressed base 54 are brought into slidably contact with each other in the horizontal direction, and so the leg part 24 is held at the position protruding from the opening 25. That is, in the usage form as a tablet PC illustrated in FIG. 4 (e.g., at the 360-degree position) and in the usage form as a tablet PC as a stand type (e.g., at the 270-degree position), the leg part 24 protrudes from the upper face 16a (the lower face in FIG. 4) of the main body part 16, and so functions as a leg part when the electronic device 10 is placed on a desk or the like. At this time, since the base 54b of the pressed base 54 and the base 50b of the pressing base 50 are stably in surface contact with each other at the base member 52, rattling of the leg part 24 can be prevented.

Meanwhile, when the display part 14 at the 360-degree position is rotated in the closing direction, the operation reversed from the rotation operation in the opening direction as stated above is generated, and so as the display part 14 is rotated from the 360-degree position to the 180-degree position, the link pin 26 moves forward. Then, as the pressing base 50 and the pressed base 54 shift again from the slidable contact state between the base 50b and the base 54b to the slidable contact state between the pressing-side inclined face 50a and the pressed-side inclined face 54a, the base member 52 also retracts downward due to the biasing force from the helical torsion coil spring 55. Then when the angular position of the display part 14 falls below 180 degrees, the leg part 24 becomes embedded again in the opening 25 as illustrated in FIG. 8A.

Figure 10:
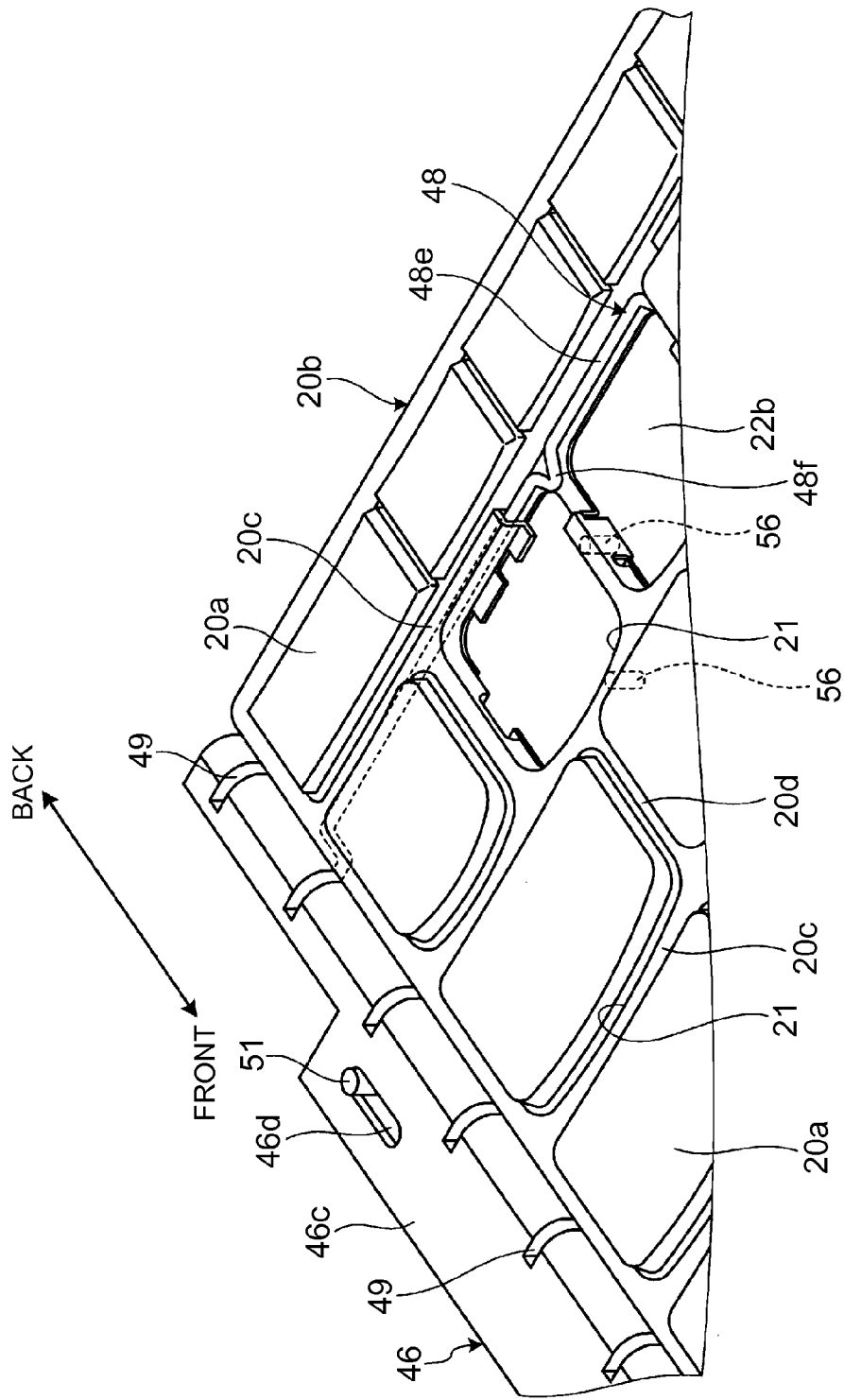
FIG. 10 is a perspective view illustrating a state of the bezel and the keys from the 0-degree position to the 180-degree position.

The following describes the movable structure of the bezel 20b. Firstly, the following describes the structure of the bezel 20b. FIG. 9(A-B) shows a side view to describe the vertical operation of the bezel 20b, where FIG. 9A illustrates the state of the bezel 20b and the link mechanism 40 from the 0-degree position to the 180-degree position, and FIG. 9B illustrates the state of the bezel 20b and the link mechanism 40 at the 360-degree position. FIG. 10 is a perspective view illustrating the state of the bezel 20b and the keys 20a from the 0-degree position to the 180-degree position, and FIG. 11 is a perspective view illustrating the state of the bezel 20b and the keys 20a at the 360-degree position.

As illustrated in FIG. 1 and FIG. 9(A-B), the bezel 20b is a frame-shaped plate member that is disposed at the periphery of the keys 20a of the keyboard 20, and can move vertically in the opening 23. The bezel 20b moves vertically because its lower face (inner face) is pressed by the driving wires 48, and can move from the descending position (see FIGS. 2, 9A and 10) where the upper face thereof is located below the top face of the keys 20a to the ascending position (see FIGS. 4, 9B and 11) where the upper face is located flush with or slightly above the top face of the keys 20a.

Figure 11:
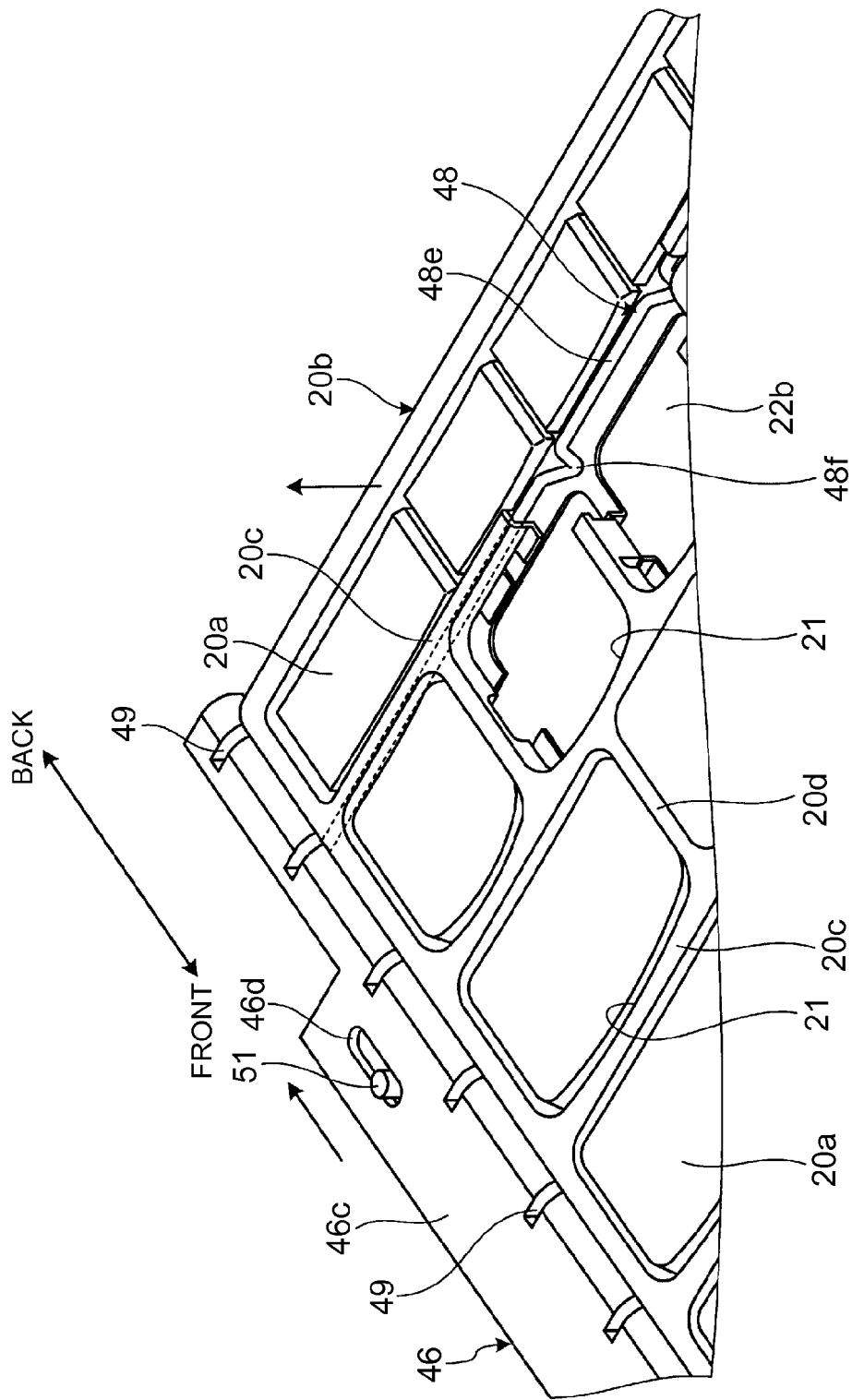
FIG. 11 is a perspective view illustrating a state of the bezel and the keys at the 360-degree position.

As illustrated in FIGS. 10 and 11, the bezel 20b includes a plurality of guide pins 56 intervening inside its breadthwise frame 20c and lengthwise frame 20d as appropriate so as to stand from the lower cover 22b. These guide pins 56 guide the bezel 20b in the horizontal direction and in the front-back direction so that the vertical operation can be smooth without rattling.

Figure 12A:
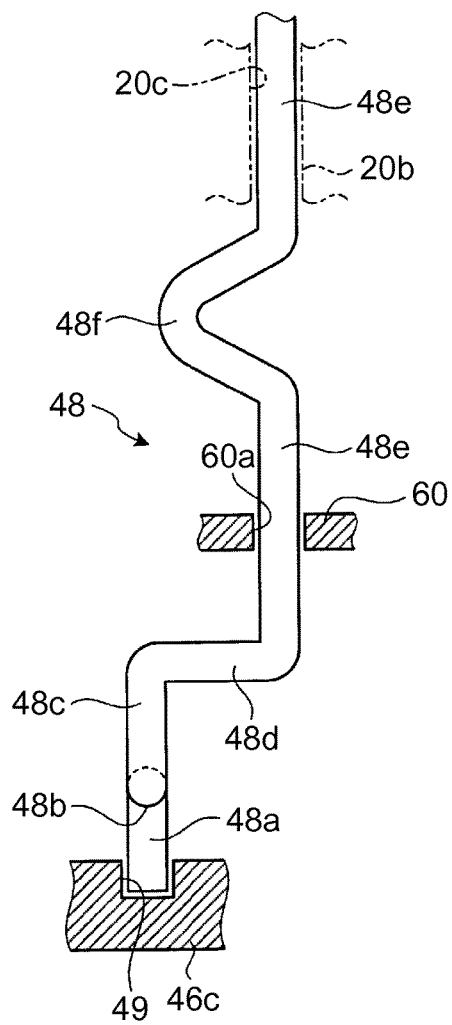
FIG. 12A illustrates a state of the driving wires from the 0-degree position to the 180-degree position.
Figure 12B:
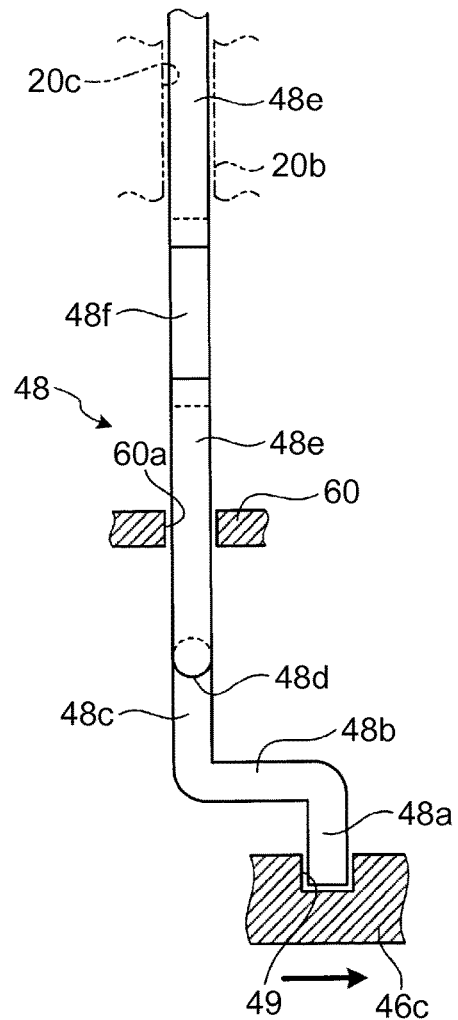
FIG. 12B illustrates a state of the driving wires at the 360-degree position.

The following describes the structure and the operation of the driving wires 48 to move the bezel 20b vertically. FIG. 12(A-B) shows a plan view schematically illustrating a driving wire 48 on its one end side to describe the operation of the driving wire 48. FIG. 12A illustrates the state of the driving wire 48 from the 0-degree position to the 180-degree position, and FIG. 12B illustrates the state of the driving wire 48 at the 360-degree position.

As illustrated in FIG. 7, the driving wires 48 are hung between the slits 49 and 49 of the left and right slide frames 46c and 46c. The driving wires 48 are hard wire members made of SUS or the like, and have enough stiffness with about 1 mm in diameter, for example. The present embodiment includes seven driving wires 48 disposed in parallel in the front-back direction. Each driving wire 48 engages with the left and right slits 49 and 49 at its ends so as to be movable vertically and be rotatable, and is jointed rotatably to the lower face of the breadthwise frame 20c of the bezel 20b extending horizontally so as to fill the spaces between the keys 20a in the front-back direction (see FIGS. 9(A-B) to 12(A-B)).

Viewed in the attitude from the 0-degree position to the 180-degree position illustrated in FIG. 12A, each driving wire 48 includes, at either end, an engagement part 48a that extends horizontally on the leading edge side to engage with the slit 49, a first arm part 48b that is bent upward from the base end of the engagement part 48a, a second arm part 48c that extends inwardly in the horizontal direction from the base end of the first arm part 48b, and a third arm part 48d that is bent backward from the base end of the second arm part 48c. A base part 48e that is bent inwardly in the horizontal direction from the third arm part 48d at both of left and right ends to extend in the horizontal direction is pivotally supported at the lower face of the breadthwise frame 20c of the bezel 20b. The base part 48e is provided with a pressing part 48f that is bent like a V-letter shape toward the front side. A plurality of such pressing parts 48f is disposed in the horizontal direction of the base part 48e so as to correspond to the lower face position of the lengthwise frame 20d of the bezel 20b extending in the front-back direction so as to fill the spaces in the horizontal direction between the keys 20a. The structure of the driving wire 48 on both end sides is horizontally symmetric.

As illustrated in FIG. 9(A-B) and FIG. 12(A-B), the base part 48e of each driving wire 48 is inserted into an elongated hole 60a in the vertical direction bored at a wall member 60, and is held rotatably or to be movable vertically in the elongated hole 60a. As shown in FIG. 1, the wall member 60 stands from the lower cover 22b of the main body chassis 22 so as to surround the periphery of the keyboard 20. FIGS. 10 and 11 omit the wall member 60 for easy viewing of the drawings.

The following describes the vertical operation of the bezel 20b using such driving wires 48. Firstly the link pin 26 does not move in the front-back direction from the position p1 as shown in FIG. 9A from the 0-degree position to the 180-degree position, and the slide frame 46c making up the link mechanism 40 also is kept at the initial position. At this time, the base part 48e of each driving wires 48 is placed on the lower cover 22b, and the pressing part 48f also is placed on the lower cover 22b on its side as shown in FIG. 9A and FIG. 12A. As a result, the third arm part 48d that is bent from the base part 48e held in the elongated hole 60a of the wall member 60 also is placed on the lower cover 22b to be in the horizontal attitude (0-degree attitude) illustrated in FIG. 9A. FIG. 9A and FIG. 9B illustrate the slide member 46 (slide frame 46c) as a transparent view to clearly show the operation of the bezel 20b and the driving wires 48.

Figure 13:
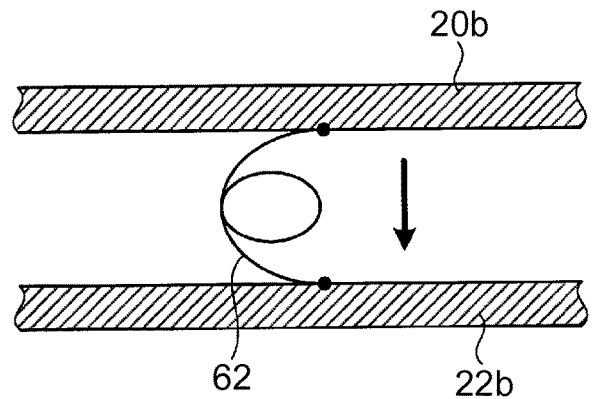
FIG. 13 is a cross-sectional view illustrating a helical torsion coil spring intervening between the bezel and the lower cover.

In this state, the bezel 20b, to which the base part 48e of the driving wire 48 is jointed, also is pulled by the base part 48e to be at the descending position, and as shown in FIG. 10, the upper face of the bezel 20b is located below the top face of the keys 20a, and so the keys 20a can be manipulated favorably. As shown in FIG. 13, a helical torsion coil spring 62 intervenes between the lower face of the bezel 20b and the upper face of the lower cover 22b to always bias the bezel 20b downward. Biasing force from the helical torsion coil spring 62 holds the bezel 20b at a predetermined descending position surely from the 0-degree position to the 180-degree position, and so rattling or the like does not occur. A plurality of such helical torsion coil springs 62 may be disposed on the lower face side of the lengthwise frame 20d of the bezel 20b, for example.

Subsequently, when the display part 14 is rotated beyond 180 degrees, the link pin 26 turns about the second shaft 30 as a shaft center and moves backward in its front-back direction. Then as illustrated in FIG. 9B and FIG. 12B, the slide frame 46c moving backward moves the engagement part 48a of each driving wire 48 backward. As a result, the engagement part 48a of each driving wire 48 ascends while rotating in the slit 49 of the slide frame 46c and the base part 48e ascends while rotating in the elongated hole 60a of the wall member 60, so that the base part 48e lifts upward and the pressing part 48f stands while coming into slidably contact with the lower cover 22b at the apex of its V-letter part.

Finally at the 360-degree position illustrated in FIG. 9B, the link pin 26 is located at the position P3, and the slide frame 46c of the slide member 46 making up the link mechanism 40 also moves further backward. As a result, as illustrated in FIGS. 9B and 12B, the third arm part 48d that is bent from the base end side of the second arm part 48c that is placed on the lower cover 22b stands from the lower cover 22b to be in the substantially vertical attitude (80-degree attitude) as illustrated in 9B. FIG. 12B shows, for easy viewing of the drawing, that the driving wire 48 is rotated by 90 degrees so that the third arm part 48d is in the vertical attitude (90-degree attitude), and actually it is in the 80-degree attitude similarly to FIG. 9B.

In this state, the base part 48e is at the ascending position ascending from the lower cover 22b, and the bezel 20b jointed to this base part 48e also is at the ascending position because it is lifted by the base part 48e against the biasing force from the helical torsion coil spring 62. As a result, as shown in FIG. 11, the upper face of the bezel 20b becomes flush with or slightly above the top face of the keys 20a and so the upper face of the keyboard 20 becomes substantially flat (see FIG. 14B also). That is, each key 20a is substantially hidden by the bezel 20b, and so the keyboard 20 does not interfere with the usage as a tablet PC.

Meanwhile, when the display part 14 at the 360-degree position is rotated in the closing direction, the operation reversed from the rotation operation in the opening direction as stated above is generated, and so as the display part 14 is rotated from the 360-degree position to the 180-degree position, the link pin 26 moves forward. Then, as illustrated in FIG. 9A and FIG. 12A, the base part 48e and the pressing part 48f of the driving wire 48 are placed on the lower cover 22b, and the third arm part 48d is placed on the lower cover 22b to return to the horizontal attitude (0-degree attitude). Along with this, the bezel 20b also is pulled by the base part 48e to be at the descending position. At this time, the biasing force from the helical torsion coil spring 62 can return the bezel 20b to the descending position securely.

Figure 14B:
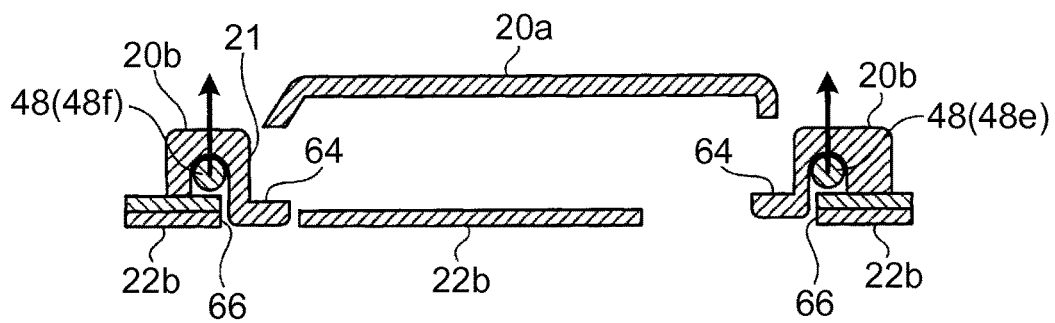
FIG. 14B illustrates a state at the 360-degree position.
Figure 14A:
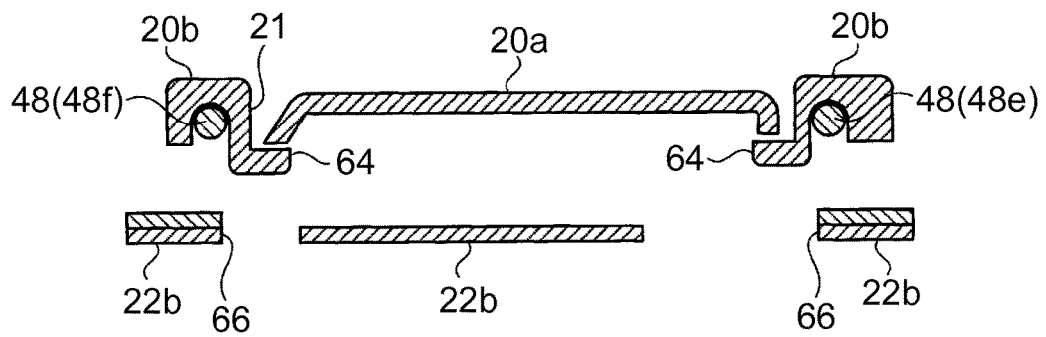
FIG. 14A illustrates a state from the 0-degree position to the 180-degree position.

As illustrated in FIG. 14A and FIG. 14B, the bezel 20b has a hole 21 corresponding to each key 20a, having a lower end part where a key stopper 64 protrudes inwardly to the inside of the hole 21.

As illustrated in FIG. 14B, when the bezel 20b is at the ascending position at the 360-degree position, the key stopper 64 ascends to the position to hold the lower end of the key 20a. This can prevent the pressing operation of the key 20a when the bezel 20b is located at the ascending position, and so can prevent the erroneous operation of the key 20a during the usage form as a tablet PC and rattling of the key 20a. As illustrated in FIG. 14A, a notch (clearance) 66 is disposed at the lower cover 22b at a position corresponding to the key stopper 64, into which the key stopper 64 can be inserted. This allows the key stopper 64 to be retracted to the position sufficiently away from the key 20a when the bezel 20b is located at the descending position from the 0-degree position to the 180-degree position, and so enough stroke of the key 20a can be kept.

The following describes the action of the buffer 44. As stated above, the electronic device 10 includes the link mechanism 40 that operates in a ganged manner with the rotation operation of the hinge mechanism 12, and so as the display part 14 is rotated from the 180-degree position to the 360-degree position, the bezel 20b and the leg parts 24 as a movable member is allowed to advance and retract from the upper face 16a of the main body part 16.

However, assume the case where the user holds the main body part 16 with the hand and tries to rotate the display part 14 to the 360-degree position so as to transform it to the usage form as a tablet PC while holding the keyboard 20 or the leg part 24 with the hand. In this case, the link member 42 receives a force to move it backward from the link pin 26, but the bezel 20b or the leg part 24 is pushed, so that its advancing movement (upward movement) is inhibited, resulting in failure to move the slide member 46. As a result, large load will be applied to the display part 14, the hinge mechanism 12 and the link mechanism 40, and breakage, for example, may occur at these parts.

Then, the electronic device 10 of the present embodiment is provided with the buffer 44 at the link mechanism 40, which is configured to enable the cancellation of the ganged operation by the link mechanism 40 between the rotation operation of the display part 14 and the advancing/retraction operation of the bezel 20b and the leg part 24. That is, the buffer 44 intervenes between the link member 42 operating in a ganged manner with the hinge mechanism 12 and the slide member 46 operating in a ganged manner with a movable member such as the bezel 20b.

With this configuration, the buffer 44 makes the link member 42 and the slide member 46 operate in an integrated manner by a coil spring 44a during the normal operation where the bezel 20b or the leg part 24 is not pressed as stated above (see the link mechanism 40 on the side of the hinge mechanism 12R in FIG. 7).

On the other hand, as illustrated in FIG. 15A, if the display part 14 is rotated while pressing the bezel 20b or the leg part 24 with a finger F, for example, the coil spring 44a extends between the link member 42 moving backward due to the link pin 26 of the hinge mechanism 12 and the slide member 46 keeping the position due to the pressing force from the finger F. Then as illustrated in FIG. 15B, the rail 42b of the link member 42 and the slider 46a of the slide member 46 mutually slide, and the rail 42b only moves backward. This enables the display part 14, the hinge mechanism 12 and the link member 42 to perform predetermined operations without problems, and so large load will not be applied to the parts of the display part 14, the hinge mechanism 12 and the link mechanism 40, and breakage or the like of these parts can be avoided.

In this way, the buffer 44 functions as a clutch to separate the link member 42 and the slide member 46, and functions as a buffer to avoid load from being applied to the parts when the bezel 20b or the leg part 24 is pushed. After rotating the display part 14 to the 360-degree position or the like while letting the coil spring 44a of the buffer 44 extend, the finger F may be pulled off in that state from the bezel 20b or the leg part 24, and then the slide member 46 moves to a predetermined position so as to follow the link member 42 due to elastic force of the coil spring 44a, so that the bezel 20b and the leg part 24 also move upward.

To this end, the coil spring 44a of the buffer 44 is desirably made up of a spring member having a spring constant enabling integral joint of the link member 42 and the slide member 46 during the normal operation and enabling substantial disconnection between the link member 42 and the slide member 46 if something unusual occurs, and optimum specifications therefor may be used in accordance with the specifications of the electronic device 10.

As stated above, the electronic device 10 according to the present embodiment includes the main body part 16 provided with the link mechanism 40 that operates in a ganged manner with the rotation operation of the display part 14 relative to the main body part 16 from the 180-degree position to the 360-degree position and moves in the front-back direction relative to the main body chassis 22 of the main body part 16, and the bezel 20b or the leg part 24 as a movable member that advances or retracts from the outer face of the main body part 16 in a ganged manner with the movement of the link mechanism 40. The link mechanism 40 further includes the buffer 44 capable of cancelling the ganged operation state of the rotation operation of the display part 14 and the advancing/retracting operation of the bezel 20b or the leg part 24 as a movable member.

In this way, even when the display part 14 is rotated while holding the bezel 20b or the leg part 24 that is to advance or retract from the outer face of the main body part 16 with a user's hand, for example, the buffer 44 can cancel the ganged operation state by the link mechanism 40 between the rotation operation of the display part 14 and the advancing/retracting operation of the bezel 20b or the leg part 24 as a movable member. This can avoid large load from being applied to the parts of the display part 14, the hinge mechanism 12 and the link mechanism 40, and can avoid breakage or the like thereto.

Figure 16:
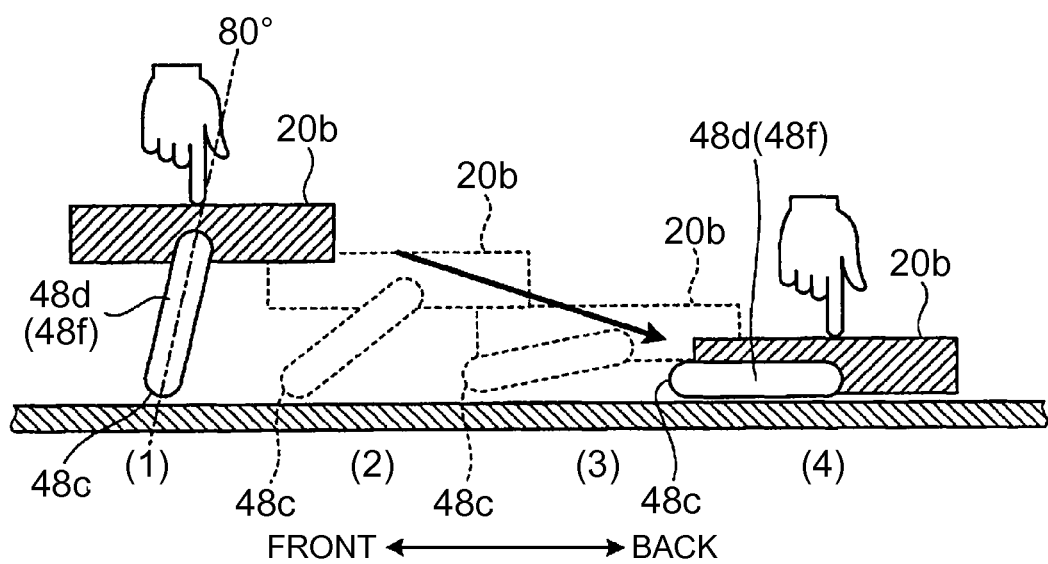
FIG. 16 illustrates an operation to forcibly press down the bezel from the ascending position.

The present embodiment is configured so that, when the display part 14 is at the 360-degree position and the base part 48e of each driving wire 48 is lifted to let the bezel 20b at the ascending position as stated above, the third arm part 48d and the pressing part 48f assume not the 90-degree attitude but the 80-degree attitude (see FIG. 9B). This makes the third arm part 48d and the pressing part 48f of each driving wire 48 rotate about the second arm part 48c that is placed on the lower cover 22a as a support as illustrated in the operation diagrams of (1) to (4) of FIG. 16 even when the bezel 20b at the ascending position is pressed forcibly downward, and these parts will fall to be the 0-degree attitude at the original 0-degree position to 180-degree position finally (see (4) of FIG. 16). This can prevent the problem of the base part 48e and the pressing part 48f from falling in the direction opposite of the specified position even when the bezel 20b at the ascending position is forcibly pressed downward, and can prevent crush or breakage of the pressing part 48f or the like because large load is applied to the driving wire 48 itself.

In this way, when the bezel 20b is forcibly pressed down, the slide member 46 (slide frame 46c) also tries to retract to the position from the 0-degree position to the 180-degree position, and so a force in the direction to separate from the link member 42 that is advanced due to the link pin 26 will occur. In this case also, the coil spring 44a of the buffer 44 extends, and so the slide member 46 only of the link mechanism 40 retracts smoothly, and so this can avoid large load from being applied to the parts of the hinge mechanism 12 and the link mechanism 40 and can avoid breakage or the like of these parts. Following the forcibly pressing of the bezel 20*b*, when the buffer 44 functions to stop the pressing of the bezel 20*b*, the slide member 46 moves to a predetermined position so as to follow the link member 42 due to elastic force of the coil spring 44*a*, so that the driving wires 48 and the bezel 20*b* also return to the original ascending positions.

The claims are not limited to the above-described example embodiments, details of which may be freely changed without departing from the spirit of the disclosure.

For example, the advancing/retracting structure of the bezel 20*b* or the leg part 24 may have another configuration instead of including the aforementioned link mechanism 40. A not-illustrated angle sensor may be disposed to detect the rotation operation of the display part 14, and the bezel 20*b* or the leg part 24 may be driven for advancing/retracting by a not-illustrated electric motor based on its detected result. For instance, in the configuration including an electric motor, the buffer may detect the load of the electric motor, and may turn ON/OFF thereof.

The electronic device 10 may be configured to advance or retract bottom-face leg parts 70 and 72 (see FIGS. 2 to 4) disposed at the bottom face of the main body part 16 using the link mechanism 40 including the buffer 44. Such bottom-face leg parts 70 and 72 enabling advancing/retracting can be embedded in the lower face 16*b* of the main body part 16 when the electronic device is used as a tablet PC as illustrated in FIG. 4, and so can avoid an increase in the overall thickness of the electronic device 10.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
a housing having an upper face and a lower face;
a keyboard disposed in the upper face of the housing;
a display part including a display;
a hinge mechanism connecting the housing to the display part in a rotatable fashion;
a driving mechanism connected to the lower face of the housing that moves vertically against the lower face of the housing in conjunction with the rotation of the display part relative to the housing; and
a link mechanism that operates in conjunction with rotation of the display part to buffer the rotation of the display part when the display part is rotated beyond a predetermined angle with respect to the housing,
wherein the driving mechanism adjusts the relative position between a frame and one or more keys of the keyboard, the frame contacting the driving mechanism.

2. The electronic device of claim 1, wherein the predetermined angle is 180 degrees.

3. The electronic device of claim 1, wherein the link mechanism includes a spring that buffers the rotation of the display part.

4. The electronic device of claim 1, further comprising:
a movable member that advances with respect to the housing when the display part is rotated beyond the predetermined angle.

5. The electronic device of claim 1, wherein the movable member is a leg.

6. The electronic device of claim 1, further comprising:
a movable member that retracts with respect to the housing when the display part is rotated back across the predetermined angle.

7. The electronic device of claim 6, wherein the movable member is a leg.

8. The electronic device according to claim 1, wherein the link mechanism includes a slide member that moves the driving mechanism.

9. A link mechanism, comprising:
a hinge case;
a slide member;
a link member disposed in a main housing of an electronic device;
the link member attaching to the hinge case that connects the main housing to a display part in a rotatable fashion;
the link member attaching to the slide member disposed within the main housing;
a driving mechanism attached to the slide member;
a buffer that buffers rotation of the display part when the display part is rotated beyond a predetermined angle with respect to the main housing; and
a frame contacting the driving mechanism,
wherein the driving mechanism adjusts the relative position between the frame and one or more keys of the keyboard.

10. The link mechanism of claim 9, wherein the buffer includes a spring.

11. The link mechanism of claim 9, wherein the driving mechanism attaches to corresponding slits in the slide member.

12. An electronic device, comprising:
a housing having an upper face and a lower face;
a keyboard disposed in the upper face of the housing;
a display part including a display;
a hinge mechanism connecting the housing to the display part in a rotatable fashion; and
a link mechanism that operates in conjunction with rotation of the display part to raise an element to a plane above a top surface of one or more keys of the keyboard when the display part is rotated beyond a predetermined angle with respect to the housing, wherein the element includes a driving mechanism;
wherein rotation of the driving mechanism adjusts the relative position between a shaped element of the driving mechanism and one or more keys of the keyboard.

* * * * *